(12) United States Patent
Mody

(10) Patent No.: US 9,756,351 B2
(45) Date of Patent: Sep. 5, 2017

(54) HEVC VIDEO ENCODER AND DECODER FOR MULTI-CORE

(71) Applicant: Texas Instruments Incorporated, Dallas, TX (US)

(72) Inventor: Mihir Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/257,550

(22) Filed: Sep. 6, 2016

(65) Prior Publication Data

US 2016/0373775 A1 Dec. 22, 2016

Related U.S. Application Data

(63) Continuation of application No. 14/315,742, filed on Jun. 26, 2014, now abandoned.

(30) Foreign Application Priority Data

Jun. 26, 2013 (IN) ............................ 2795CHE/2013

(51) Int. Cl.
| | |
|---|---|
| *H04N 19/436* | (2014.01) |
| *H04N 19/119* | (2014.01) |
| *H04N 19/156* | (2014.01) |
| *H04N 19/174* | (2014.01) |
| *H04N 19/423* | (2014.01) |
| *H04N 19/82* | (2014.01) |

(52) U.S. Cl.
CPC ......... *H04N 19/436* (2014.11); *H04N 19/119* (2014.11); *H04N 19/156* (2014.11); *H04N 19/174* (2014.11); *H04N 19/423* (2014.11); *H04N 19/82* (2014.11)

(58) Field of Classification Search
CPC .................. H04N 19/00945; H04N 19/00533
See application file for complete search history.

(56) References Cited

U.S. PATENT DOCUMENTS

| | | | | |
|---|---|---|---|---|
| 2012/0213448 A1* | 8/2012 | Malmborg | ............. | H04N 19/60 382/234 |
| 2014/0247875 A1* | 9/2014 | Hattori | ............. | H04N 19/00533 375/240.12 |
| 2014/0301657 A1* | 10/2014 | Hattori | ............... | G06K 15/1836 382/239 |

* cited by examiner

*Primary Examiner* — Nam Pham
(74) *Attorney, Agent, or Firm* — Robert D. Marshall, Jr.; Charles A. Brill; Frank D. Cimino

(57) ABSTRACT

The disclosure provides a video encoder. The video encoder receives a frame and divides the frame into a plurality of tiles. The video encoder includes a plurality of video processing engines communicatively coupled with each other. Each video processing engine receives a tile of the plurality of tiles. A height of each tile is equal to a height of the frame and each tile comprises a plurality of rows. The plurality of video processing engines includes a first and a second video processing engine. The second video processing engine being initiated after the first video processing engines processes M rows of the plurality of rows of the tile, where M is an integer.

7 Claims, 5 Drawing Sheets

HEVC VIDEO ENCODER AND DECODER FOR MULTI-CORE

This application: is a continuation of U.S. patent application Ser. No. 14/315,742, filed Jun. 26, 2014.

CROSS REFERENCES TO RELATED APPLICATIONS

This application claims priority from India provisional patent application No. 2795/CHE/2013 filed on Jun. 26, 2013, which is hereby incorporated by reference in its entirety.

TECHNICAL FIELD

Embodiments of the disclosure relate generally to video coding and more particularly to video encoding and decoding in multiple video hardware engines or in multi-core processors.

BACKGROUND

High Efficiency Video Coding (HEVC) is a latest video compression standard, successor to H.264/MPEG-4 AVC (Advanced Video Coding), jointly developed by the ISO/IEC Moving Picture Experts Group (MPEG) and ITU-T Video Coding Experts Group (VCEG) as ISO/IEC 23008-2 MPEG-H Part 2 and ITU-T H.265.

A video input signal has multiple frames. HEVC divides a frame into rectangular blocks or LCUs (largest coding units) or macro-blocks of 16×16, 32×32 or 64×64. An optimal size of the LCU is selected based on the video content. HEVC provides for video frame division into multiple tiles and slices to enable parallel processing. In this scheme, discontinuities can occur in a filtered video signal at the LCU boundaries which are known as blocking artifacts. The blocking artifacts can, for instance, arise due to different intra predictions of the blocks, quantization effects and motion compensation. Loop filters are used in the HEVC encoder/decoder in order to combat blocking artifacts.

HEVC promises half bit-rate compared to current de-facto video standard namely H.264 at a similar video quality and expected to be deployed in wide variety of video applications ranging from cell phones, broadcast, set-top box, video conferencing, video surveillance, automotive etc. HEVC is enabling industry in transitioning to 4K (ultra high-definition (HD)) resolutions due to better compression efficiency and transparent quality. The performance requirement for HEVC video solution can vary widely based on application area. This poses a new challenge to architects in designing HEVC hardware and/or software solution.

An approach of designing a single monolithic engine for ultra-HD resolution results in a complex design of hardware and software. Also, the single monolithic engine is non-optimal solution for lower resolution video for example HD (high definition) or D1 (standard definition).

An alternative approach for performance up-scaling is using multiple copies of video hardware engines and/or processor cores. This solution has issues in partitioning of frames across these multiple cores due to loop filter dependencies across slice and tiles.

The prior approaches of handling the loop filter dependencies had several drawbacks. A first approach is to disable loop filtering. This approach results in degrading the quality of the video at slice/tile boundaries. A second approach is to enable loop filtering and control a rate of encoding at the boundaries of the slices/tiles. The controlled rate of video encoding in this approach degrades video quality at other portions of the frame in addition to the boundaries of the slices/tiles.

A third approach is to provide multiple video processing engines and each engine processes a separate frame. This approach results in latency of frames and hence is not efficient for application such as video conferencing, video surveillance and gaming etc. A fourth approach is to use multiple video processing engines for processing of a video and a separate loop filter. The multiple video processing engines perform function such as motion estimation, transform and quantization. After these processing operations, the separate loop filter performs loop filtering. This approach increase the overhead of the system since an additional memory bandwidth is required for input and output of the separate loop filter and also it increases the processing cycles used for video encoding/decoding.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a video encoder. The video encoder receives a frame and divides the frame into a plurality of tiles. The video encoder includes a plurality of video processing engines communicatively coupled with each other. Each video processing engine receives a tile of the plurality of tiles. A height of each tile is equal to a height of the frame and each tile comprises a plurality of rows. The plurality of video processing engines includes a first and a second video processing engine. The second video processing engine being initiated after the first video processing engines processes M rows of the plurality of rows of the tile, where M is an integer.

Another embodiment provides a video decoder. The video decoder receives a compressed bit-stream corresponding to a frame. The frame includes a plurality of tiles. The video decoder includes a plurality of video processing engines communicatively coupled with each other. Each video processing engine receives a compressed bit-stream corresponding to a tile of the plurality of tiles. Each tile comprises a plurality of rows. A height of each tile is equal to a height of the frame and a width of each tile is equal to a width of the frame divided by a number of video processing engines in the video decoder. The plurality of video processing engines includes a first and a second video processing engine. The second video processing engine is initiated after the first video processing engines processes compressed bit-stream corresponding to M rows of the plurality of rows of the tile, where M is an integer.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
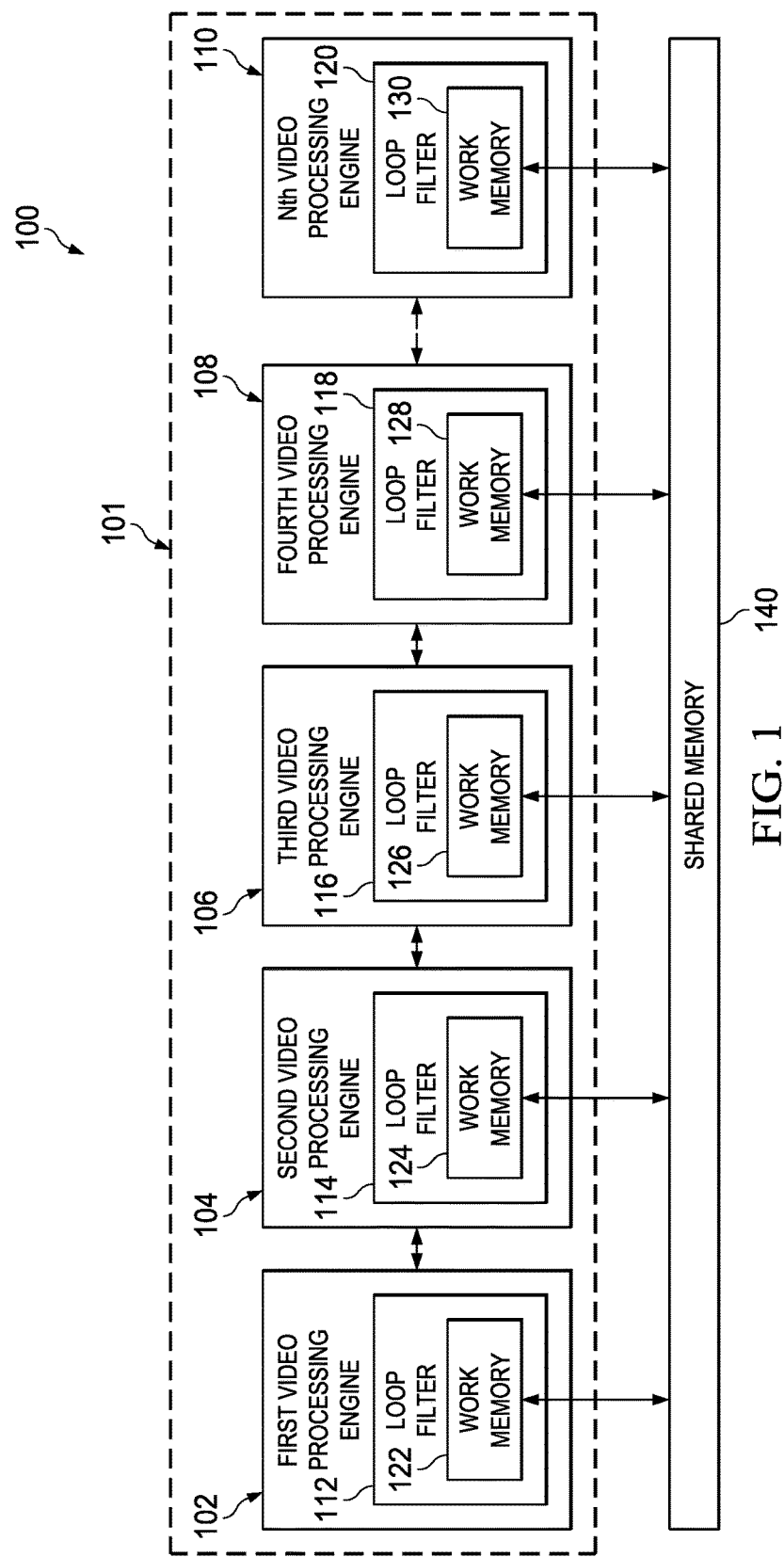
FIG. 1 illustrates a block diagram of a video encoder, according to an example embodiment.

FIG. 1 illustrates a block diagram of a video encoder 100, according to an example embodiment. The video encoder 100 includes a plurality of video processing engines 101. The plurality of video processing engines 101 includes a first video processing engine 102, a second video processing engine 104, a third video processing engine 106, a fourth video processing engine 108 and an $N^{th}$ video processing engine 110. It is to be noted that the video processing engines 102, 104, 106, 108 and 110 are according to an example embodiment and the video encoder 100 includes one or more video processing engines.

A video processing engine, in one example, is a hard wired processor or ASIC (application specific integrated circuit). In another example, the video processing engine is a programmable circuitry that can be configured to perform multiple functions. In an additional example, the video processing engine is a software implemented on a processing device. In yet another example, the video processing engine is a combination of a hard wired processor and a software implemented on a processing device. The processing device can be, for example, a CISC-type (Complex Instruction Set Computer) CPU, RISC-type CPU (Reduced Instruction Set Computer), or a digital signal processor (DSP). In one version, the video processing engine is an HEVC video hardware engine that includes blocks such as (but not limited to) motion estimation block, motion compensation block, quantization and transform block and loop filter block.

Each video processing engine of the plurality of video processing engines 101 is communicatively coupled with each other. In one version, each video processing engine communicates with the other video processing engine through a direct path and/or indirect path. For example, the first video processing engine 102 communicates with the second video processing engine 104 through a direct path. In another example, the first video processing engine 102 communicates with the third video processing engine 106 through an indirect path which is through the second video processing engine 104. In another version, the plurality of video processing engines 101 communicates through a controller. The controller is on-chip or off-chip depending on requirement of the video encoder 100. In an additional version, the plurality of video processing engines 101 communicates through a message network.

Each video processing engine includes a loop filter and each loop filter includes a work memory. For example, the first video processing engine 102 includes a loop filter 112 and a work memory 122 and the second video processing engine 104 includes a loop filter 114 and a work memory 124. Similarly, the third video processing engine 106 includes a loop filter 116 and a work memory 126, the fourth video processing engine 108 includes a loop filter 118 and a work memory 128, and the $N^{th}$ video processing engine 110 includes a loop filter 120 and a work memory 130. The work memory stores a set of parameters and pixel dependencies across LCUs which are required during loop filtering operation. In one embodiment, a video processing engine includes one or more loop filters and each loop filter includes one or more work memory. In another embodiment, each of the video processing engine is coupled to a common loop filter that includes multiple memories and each memory is dedicated to a video processing engine. It is noted that the video encoder 100 as illustrated in FIG. 1 is one of the many ways of implementing video encoder 100 and variations, and alternative constructions are apparent and well within the spirit and scope of the disclosure.

The video encoder 100 includes a shared memory 140. In an example, the plurality of video processing engines 101 communicates through the shared memory 140. In another example, the plurality of video processing engines 101 exchange data through the shared memory 140. In one version, the shared memory 140 is on-chip as the video encoder 100. In another version, the shared memory 140 is external to the video encoder 100. The shared memory 140 can be a memory such as (but not limited to) DDR (double data rate) memory, RAM (random access memory), flash memory, or disk storage. A work memory in each video processing engine is coupled to the shared memory 140. For example, work memory 122, 124, 126, 128 and 130 are coupled to the shared memory 140. The video encoder 100 may include one or more additional components known to those skilled in the relevant art and are not discussed here for simplicity of the description.

The video encoder 100 receives a video having a plurality of frames. The video encoder 100 divides each frame of the plurality of frames into a plurality of tiles. Thus, a frame has a plurality of tiles, and a height of each tile of the plurality of tiles is equal to a height of the frame. A width of the tile is equal to a width of the frame divided by a number of video processing engines in the video encoder 100. For example, if the width of the frame is W and the video encoder 100 has 4 video processing engines; the width of a tile will be equal to W/4. Hence, the frame is divided into 4 tiles. In one example, a frame includes tiles of different widths such as width of one tile in the frame is W/4 and a width of another tile in the same frame is W/2. In another example, a frame includes tiles of non-uniform width such that a sum of the widths of the tiles is equal to the width of the frame. Each tile includes a plurality of rows. Each row of the plurality of rows includes a plurality of LCUs (largest coding units) and each LCU includes a plurality of pixels. Each tile is allocated to a video processing engine. In an example, a first tile is allocated to a first video processing engine 102 and a second tile is allocated to a second video processing engine 104. The first tile and the second tile are adjacent tiles of the plurality of tiles.

The first video processing engine 102 processes M rows of the first tile, where M is an integer. The processing of M rows generates a set of parameters and partially filtered pixels corresponding to a set of LCUs in the M rows of the first tile. In one example, the set of LCUs includes a last LCU in each of the M rows. The last LCU in each of the M rows share a boundary with an LCU in the second tile. The set of parameters include (but not limited to), motion vector information, SAO (sample adaptive offset), quantization parameters and coding unit parameters. The set of parameters and the partially filtered pixels are stored in the work memory 122. The work memory 122 is associated with the first video processing engine 102.

The set of parameters and the partially filtered pixels are provided to the shared memory 140 from the work memory 122. In one example, the first video processing engine 102 stores the set of parameters and the partially filtered pixels in the shared memory 140. In another example, a controller associated with the video encoder 100 stores the set of parameters and the partially filtered pixels in the shared memory 140. In an additional example, a sharing of the set of parameters and the partially filtered pixels between the shared memory 140 and the work memory is managed by a DMA (direct memory access) engine. The set of parameters and the partially filtered pixels are provided from the shared memory 140 to the second video processing engine 104 for processing the second tile. In one version, the second video processing engine 104 access the shared memory 140 and use the set of parameters and the partially filtered pixels for processing of the second tile. In another version, the second video processing engine 104 access the shared memory 140 and transfers the set of parameters and the partially filtered pixels from the shared memory 140 to the work memory 124.

Thus, the second video processing engine 104 is initiated after the first video processing engine 102 processes M rows of the first tile. In one embodiment, M is equal to 1. Hence, the first video processing engine 102 processes 1 row of the first tile before the second video processing engine 104 is initiated to process the second tile. Initiating the second video processing engine 104 includes activating the second video processing engine 104 on receiving the set of parameters and the partially filtered pixels from the first video processing engine 102.

In one version, a controller associated with the plurality of video processing engines 101 initiates a video processing engine. The controller activates the second video processing engine 104 and provides the set of parameters and the partially filtered pixels obtained from the first video processing engine 102 to the second video processing engine 104. The second video processing engine 104 processes K rows of the second tile and generates a corresponding set of parameters and the partially filtered pixels. The second video processing engine 104 generates the set of parameters and partially filtered pixels corresponding to a set of LCUs in the K rows of the second tile. In one example, the set of LCUs includes a last LCU in each of the K rows. The last LCU in each of the K rows share a boundary with an LCU in the third tile. The third video processing engine 106 is initiated on receiving the set of parameters and the partially filtered pixels generated by the second video processing engine 104. The operation of video encoder 100 is further illustrated in connection with FIG. 2. In one example, K is equal to M.

In another example embodiment, the FIG. 1 is a block diagram of a video decoder. The video decoder is similar in connection to the video encoder 100. However, the operation of a video decoder is inverse of the operation of a video encoder. The video decoder receives a compressed bit-stream corresponding to a frame. The frame includes a plurality of tiles. The video decoder includes a plurality of video processing engines 101 communicatively coupled with each other. Each video processing engine configured to receive a compressed bit-stream corresponding to a tile of the plurality of tiles, wherein a height of each tile is equal to a height of the frame and a width of each tile is equal to a width of the frame divided by a number of video processing engines in the video decoder. The video decoder includes a first video processing engine 102 and a second video processing engine 104 of the plurality of video processing engines 101. The second video processing engine 104 is initiated after the first video processing engine 102 processes compressed bit-stream corresponding to M rows of a tile, where M is an integer.

The first video processing engine 102 processes a compressed bit-stream corresponding to a first tile and the second video processing engine 104 processes a compressed bit-stream corresponding to a second tile. The first tile and the second tile are adjacent tiles of the plurality of tiles. The first video processing engine 102 processes compressed bit-stream corresponding to M rows of the first tile and generate a set of parameters and partially filtered pixels corresponding to a set of LCUs in the M rows of the first tile. The second video processing engine 104 is initiated on receiving the set of parameters and partially filtered pixels from the first video processing engine 102.

Each video processing engine is capable of performing encoding and/or decoding at lower resolution for example at 1080P. However, the video encoder 100 with the plurality of video processing engines 101 is capable of performing encoding and/or decoding at higher resolution for example at 4K resolution.

The video encoder 100 uses a loop filter in each of the video processing engines and hence the quality of the video processed in the video encoder 100 is not degraded. Also, a controlled rate of encoding is not used in the video encoder 100 and hence the quality of the video processed in the video encoder 100 is uniform. The video encoder 100 also finds application in areas such as (but not limited to) video conferencing, video surveillance and gaming etc. since frame latency does not arise in the video encoder 100. Also, no additional loop filters are required in the video encoder 100 which were responsible for increasing memory requirement of conventional video encoders. Thus, the video encoder 100 helps in achieving high performance to implement ultra-HD (4K) video playback and record.

Although the present disclosure and its advantages have been described with respect to a video encoder, all the embodiments are similarly applicable to a video decoder.

Figure 2:
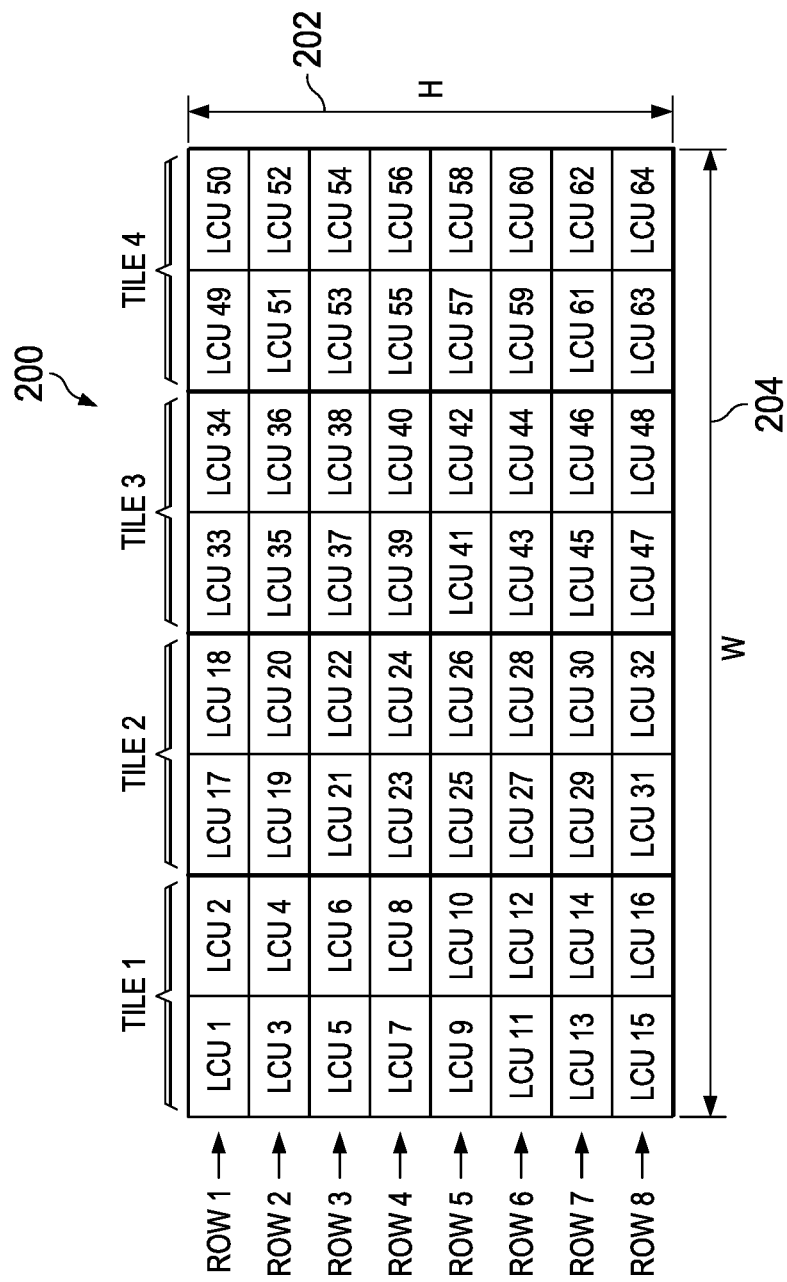
FIG. 2 illustrates a frame received in a video encoder, according to an embodiment.

FIG. 2 illustrates a frame 200 received in a video encoder, according to an embodiment. In one version, a video is received at the video encoder and the video contains a plurality of frames. The frame 200 is a frame of the plurality of frames. The frame 200 has a height H 202 and a width W 204. The frame 200 is an 8×8 frame i.e. the frame 200 has 8 LCU (largest coding unit) in each row and 8 LCU in each column. Each of the LCU 1, LCU 2 till LCU 63 and LCU 64 represents an LCU in the frame 200. Each LCU further includes a plurality of pixels. The frame 200 is illustrated as an 8×8 frame to explain the logical flow and for ease of understanding, and is understood not to limit the scope of the present disclosure.

The frame 200 is divided into a plurality of tiles such as, but not limited to, tile 1, tile 2, tile 3 and tile 4. It is to be noted that the tiles illustrated in FIG. 2 are exemplary and the frame 200, in another example, includes one or more tiles. A height of each tile of the plurality of tiles is equal to the height (H) 202 of the frame i.e., each tile has a height H 202. The processing of the frame 200 is illustrated with the help of video encoder 100 illustrated in FIG. 1.

In one example, the frame 200 is divided into a plurality of tiles by the video encoder 100. The video encoder 100 includes a plurality of video processing engines 101. The plurality of video processing engines 101 includes a first video processing engine 102, a second video processing engine 104, a third video processing engine 106, a fourth video processing engine 108 and an $N^{th}$ video processing engine 110. A width of each tile is equal to the width W 204 of the frame divided by a number of video processing engines in the video encoder 100. In an example, when the video encoder 100 has four video processing engines, the frame 200 is divided into four tiles each of height H 202 and width W/4. In another example, a frame includes tiles of non-uniform width such that a sum of the widths of the tiles is equal to the width of the frame W 204. Each tile includes a plurality of rows. For example, as illustrated in the figure, Row 1 to Row 8 represents the plurality of rows in each tile. Each row of the plurality of rows includes a plurality of LCU. For example, Row 1 of tile 1 includes LCU 1 and LCU 2. Similarly, Row 2 of the tile 2 includes LCU 19 and LCU 20.

Each tile is allocated to a video processing engine in the video encoder 100. For example, tile 1 is allocated to the first video processing engine 102, tile 2 is allocated to the second video processing engine 104, tile 3 is allocated to the third video processing engine 106 and tile 4 is allocated to the fourth video processing engine 108. The first video processing engine 102 processes M rows of tile 1, where M is an integer. The processing of M rows generates a set of parameters and partially filtered pixels corresponding to a set of LCUs in the M rows of the tile 1. In one example, the set of LCUs includes a last LCU in each of the M rows. The last LCU in each of the M rows share a boundary with an LCU in the tile 2. In one version, the first video processing engine 102 processes 1 row of tile 1 for example, Row 1. LCU 2 is the last tile in Row 1. Therefore, the first video processing engine 102 generates a set of parameters and partially filtered pixels corresponding to the LCU 2 in the tile 1. In another version, M is 2 and the first video processing engine 102 processes 2 rows of tile 1, for example Row 1 and Row 1. The processing of the LCU 2 and LCU 4 generates a set of parameters and partially filtered pixels corresponding to these LCUs.

The second video processing engine 104 is initiated to process tile 2 after the first video processing engine 102 processes M rows to the tile 1. In an example, the first video processing engine 102 processes Row 1 of tile 1, and the set of parameters and partially filtered pixels thus generated are provided to the second video processing engine 104 for processing of tile 2. The second video processing engine 104 use the set of parameters and partially filtered pixels, received from the first video processing engine 102, for processing LCU 17 and LCU 18.

Similarly, the first video processing engine 102 processes Row 2 of tile 1 and the set of parameters and partially filtered pixels thus generated are provided to the second video processing engine 104 for processing LCU 19 and LCU 20. The first video processing engine 102 processes tile 1 in parallel to the second video processing engine 104 processing tile 2. Thus, when the first video processing engine 102 is processing LCU 3 and LCU 4, the second video processing engine 104 processes LCU 17 and LCU 18.

The second video processing engine 104 processes K rows of the tile 2 and generates corresponding set of parameters and the partially filtered pixels. In one example, the second video processing engine 104 generates the set of parameters and partially filtered pixels corresponding to LCU 18 in the Row 1 of the tile 2. The third video processing engine 106 is initiated on receiving the set of parameters and the partially filtered pixels generated by the second video processing engine 104. The third video processing engine 106 processes Row 1 of tile 3 i.e. LCU 33 and LCU 34 on receiving the set of parameters and partially filtered pixels corresponding to LCU 18 from the second video processing engine 104.

The first video processing engine 102 processes tile 1, the second video processing engine 104 processes tile 2 and the third video processing engine processes tile 3 in parallel. Thus, when the first video processing engine 102 is processing LCU 5 and LCU 6, the second video processing engine 104 processes LCU 19 and LCU 20 and the third video processing engine 106 processes LCU 33 and LCU 34. This is explained in detail in the following timing diagram of FIG. 3.

Figure 3:
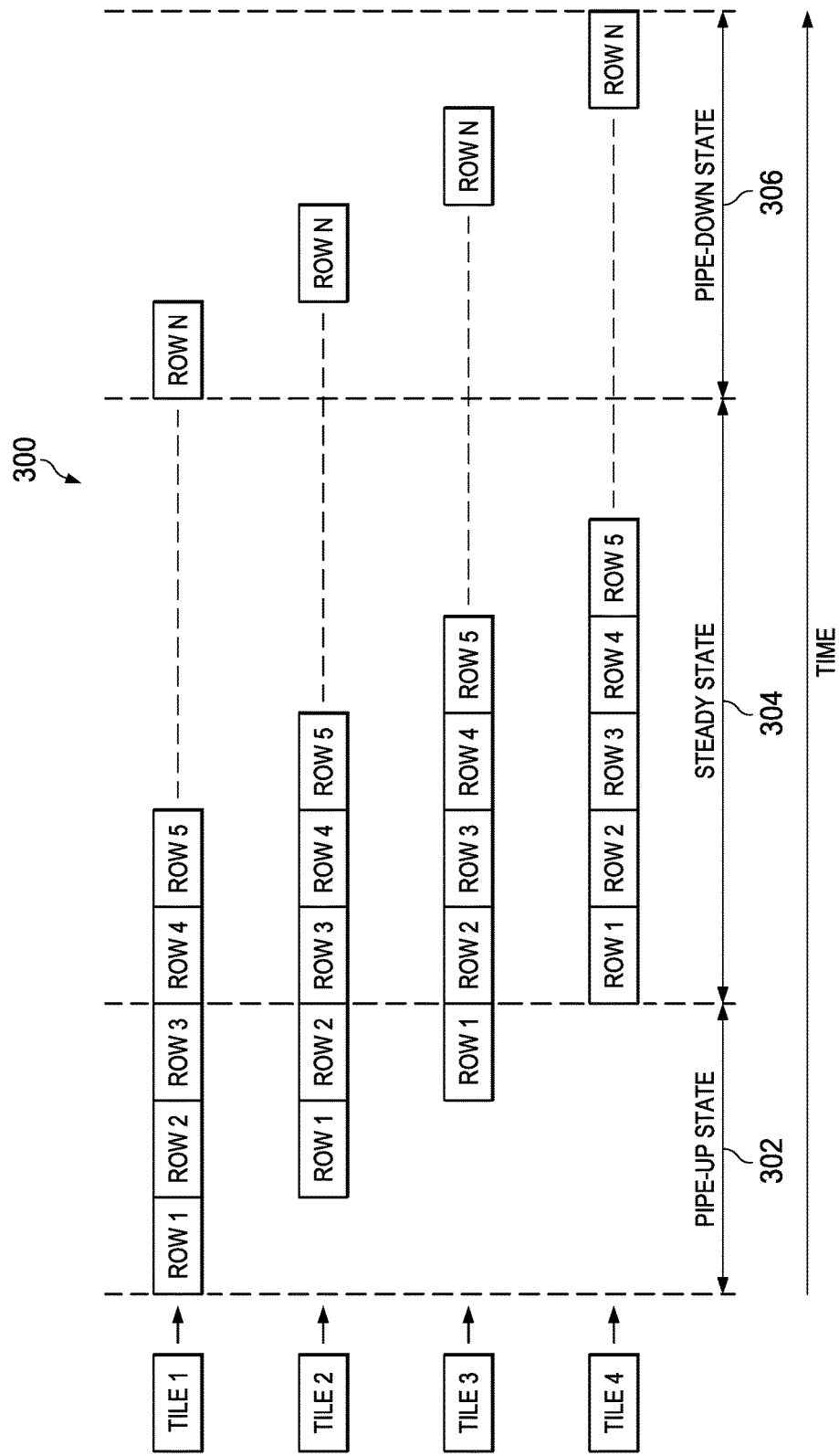
FIG. 3 illustrates a timing diagram of a video encoder, according to an embodiment.

FIG. 3 illustrates a timing diagram 300 of a video encoder, according to an embodiment. The timing diagram 300 is explained using the frame 200 (illustrated in FIG. 2). The video encoder 100 receives the frame 200 which is divided into four tiles, tile 1, tile 2, tile 3 and tile 4. Each tile is processed by a video processing engine in the video encoder. In an example, tile 1 is allocated to the first video processing engine 102, tile 2 is allocated to the second video processing engine 104, tile 3 is allocated to the third video processing engine 106 and tile 4 is allocated to the fourth video processing engine 108. Tile 1 is adjacent to tile 2, tile 2 is adjacent to tile 3 and tile 3 is adjacent to tile 4.

The first video processing engine 102 processes Row 1 of tile 1 and generates a set of parameters and partially filtered pixels corresponding to a last LCU in the Row 1 of the tile 1 for example LCU 2. The second video processing engine 104 is initiated to process Row 1 of the tile 2 on receiving the set of parameters and partially filtered pixels from the first video processing engine 102. Similarly, the second video processing engine 104 process Row 2 of tile 2 when it receives a set of parameters and partially filtered pixels corresponding to Row 2 of tile 1 from the first video processing engine 102.

A state in which each video processing engines in the video encoder 100 is initiated to process the respective tile is referred as pipe-up state 302. In one example, when the video encoder 100 has four video processing engines, a time from the initiation of the first video processing engine 102 to a time of the initiation of the fourth video processing engine 108 represents the pipe-up state 302. Thus, in pipe-up state 302, when the first video processing engine 102 is processing Row 3 of tile 1, the second video engine processes Row 2 of tile 2, the third video processing engine processes Row 1 of tile 3 and the fourth video processing engine 108 is initiated to process tile 4. In a steady state 304, all the video processing engines in the video encoder 100 perform processing of respective allocated tiles in parallel. As illustrated, in steady state 304, the first video processing engine 102 processes Row 4 of tile 1, the second video processing engine 104 processes Row 3 of tile 2, the third video processing engine 106 processes Row 2 of tile 3 and the fourth video processing engine 108 processes Row 1 of tile 4, in parallel.

A state in which each video processing engines in the video encoder 100 processes a last row in the respective tile is represented as pipe-down state 306. Thus, a time when the first video processing engine 102 processes Row N of the tile 1 to the time when the fourth video processing engine 108 processes Row N of the tile 4, represents the pipe-down state 306. Row N represents a last row in the respective tiles. For example Row 8 in FIG. 3 represents a last row of tile 1, tile 2, tile 3 and tile 4.

Figure 4:
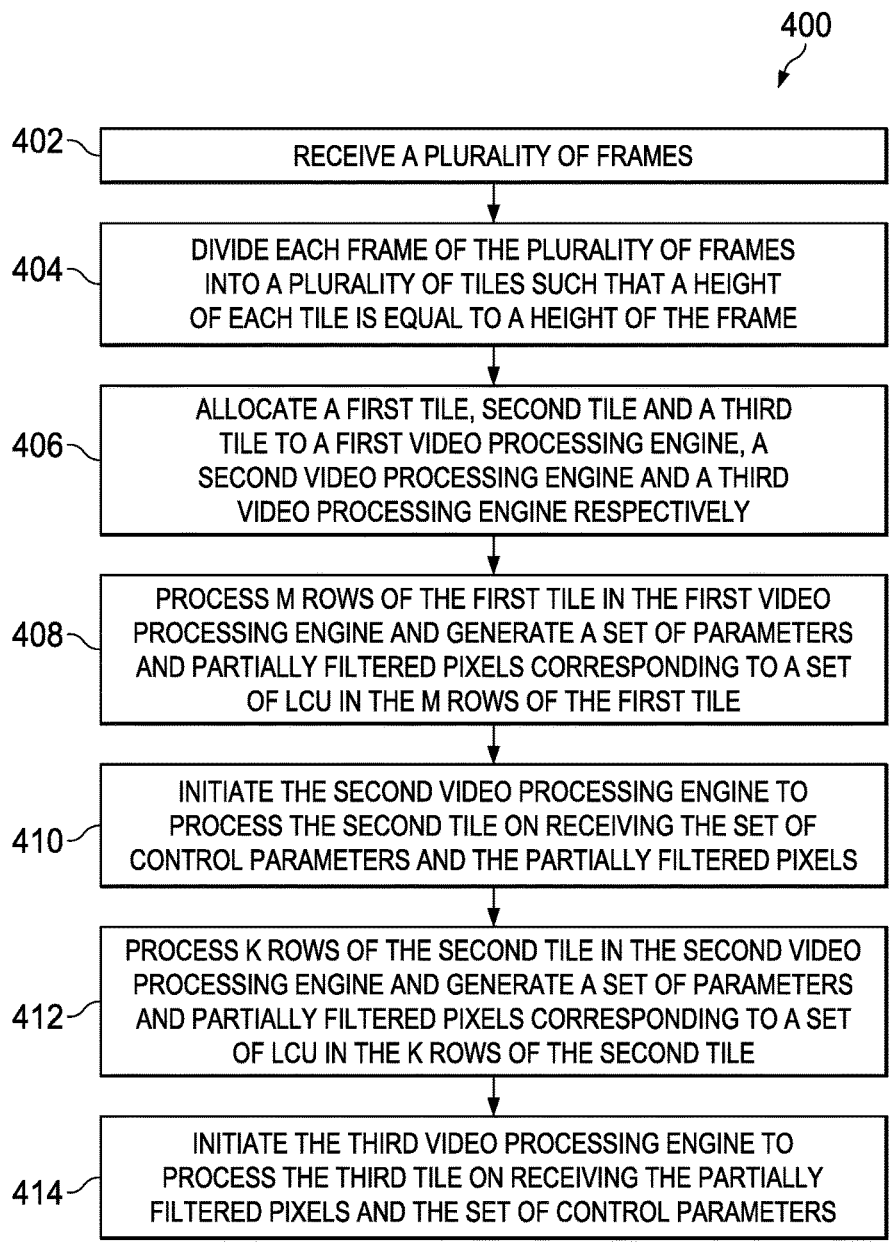
FIG. 4 illustrates a flowchart of a method of video encoding, according to an embodiment.

FIG. 4 illustrates a flowchart 400 of a method of video encoding, according to an embodiment. At step 402, a video is received that includes a plurality of frames. At step 404, each frame of the plurality of frames is divided into a plurality of tiles. A height of each tile is equal to a height of the frame. A frame is divided into three tiles, a first tile, a second tile and a third tile and height of each tile is equal to a height of the frame. The video encoder includes a first video processing engine, a second video processing engine and a third video processing engine. At step 406, the first tile, the second tile and the third tile are allocated to the first video processing engine, the second video processing engine and the third video processing engine respectively. At step 408, the first video processing engine processes M rows of the first tile, where M is an integer. The processing of M rows generates a set of parameters and partially filtered pixels corresponding to a set of LCUs in the M rows of the first tile. In one example, the set of LCUs includes a last LCU in each of the M rows. The last LCU in each of the M rows share a boundary with an LCU in the second tile. The second video processing engine is initiated on receiving the set of control parameters and the partially filtered pixels from the first video processing engine, at step 410.

At step 412, the second video processing engine processes K rows of the second tile, where K is an integer. The processing of K rows generates a set of parameters and partially filtered pixels corresponding to a set of LCUs in the K rows of the second tile. In one example, the set of LCUs includes a last LCU in each of the K rows. The last LCU in each of the K rows share a boundary with an LCU in the third tile. The third video processing engine is initiated on receiving the set of control parameters and the partially filtered pixels from the second video processing engine, at step 414.

Figure 5:
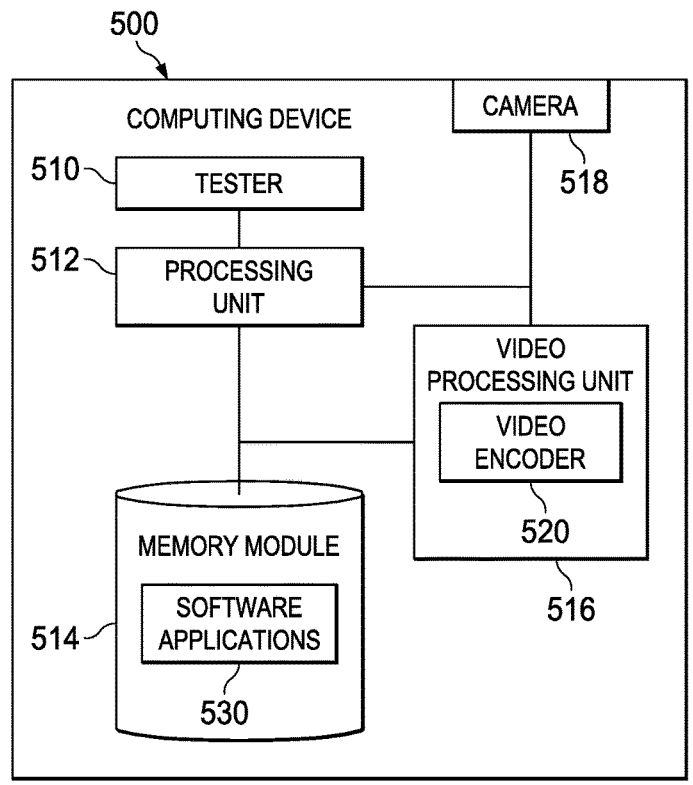
FIG. 5 illustrates a computing device, according to an embodiment.

FIG. 5 illustrates a computing device 500 according to an embodiment. The computing device 500 is, or is incorporated into, a mobile communication device, such as a mobile phone, a personal digital assistant, a transceiver, a personal computer, or any other type of electronic system. The computing device 500 may include one or more additional components known to those skilled in the relevant art and are not discussed here for simplicity of the description.

In some embodiments, the computing device 500 comprises a megacell or a system-on-chip (SoC) which includes a processing unit 512 such as a CPU (Central Processing Unit), a memory module 515 (e.g., random access memory (RAM)) and a tester 510. The processing unit 512 can be, for example, a CISC-type (Complex Instruction Set Computer) CPU, RISC-type CPU (Reduced Instruction Set Computer), or a digital signal processor (DSP). The memory module 515 (which can be memory such as RAM, flash memory, or disk storage) stores one or more software applications 530 (e.g., embedded applications) that, when executed by the processing unit 512, performs any suitable function associated with the computing device 500. The tester 510 comprises logic that supports testing and debugging of the computing device 500 executing the software applications 530. For example, the tester 510 can be used to emulate a defective or unavailable component(s) of the computing device 500 to allow verification of how the component(s), were it actually present on the computing device 500, would perform in various situations (e.g., how the component(s) would interact with the software applications 530). In this way, the software applications 530 can be debugged in an environment which resembles post-production operation.

The processing unit 512 typically comprises memory and logic which store information frequently accessed from the memory module 515. A camera 518 is coupled to the processing unit 512. The computing device 500 includes a video processing unit 516. The video processing unit 516 is coupled to the processing unit 512 and the camera 518. The video processing unit 516 includes a video encoder 520. The video encoder 520 is similar to the video encoder 100 (illustrated in FIG. 1) in connection and operation. The image/video data shot by the camera 518 is processed in the video processing unit 516.

The video encoder 520 includes a plurality of video processing engines. The video data in the video encoder 520 is processed by dividing the frames in the video data into plurality of tiles and the height of each tile is equal to the height of the frame. Each tile is allocated to a video processing engine. The video encoder 520 uses a loop filter in each of the video processing engines and hence the quality of the video processed in the video encoder 100 is not degraded. The video encoder 520 helps in achieving high performance to implement ultra-HD (4K) video playback and record As discussed earlier, a video decoder works on the same principle of the video encoder 100 (illustrated in FIG. 1). Hence, the video encoder 520 in one embodiment is the video decoder.

Figure 6:
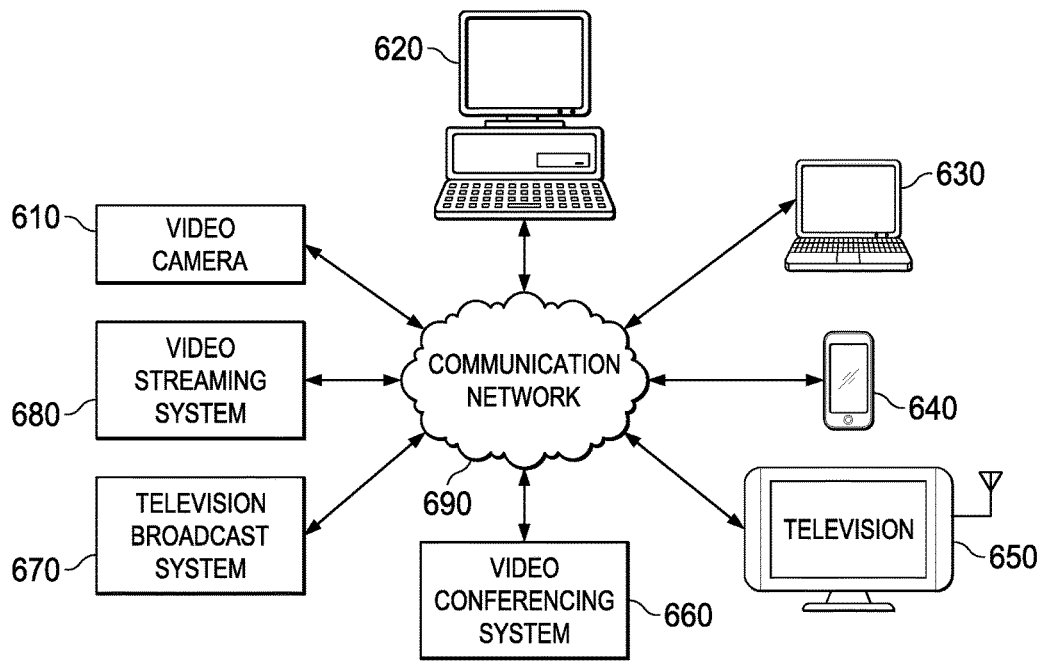
FIG. 6 is an example environment in which various aspect of the present disclosure may be implemented.

FIG. 6 is an example environment in which various aspects of the present disclosure may be implemented. As shown, the environment may comprise, for example, one or more video cameras 610, computers 620, personal digital assistants (PDA) 630, mobile devices 640, televisions 650, video conference systems 660, video streaming systems 680, TV broadcasting systems 670 and communication networks/channels 690.

The video cameras 610 are configured to take continuous pictures and generate digital video, a signal comprising sequence of image frames. The video cameras 610 are configured to process the image frames for efficient storage and/or for transmission over the communication networks/channels 690. The computers 620, PDAs 630 and the mobile devices 640 are configured to encode the video signals for transmission and to decode encoded video signals received from the communication networks/channels 690. The video streaming systems 680 is configured to encode video signal and to transmit the encoded video signals over the communication networks/channels 690 responsive to a received request and/or asynchronously. The television broadcasting systems 670 are configured to process video signals in accordance with one or more broadcast technologies and to broadcast the processed video signals over the communication networks/channels 690. The video conference systems 660 are configured to receive a video signal from one or more participating/conferencing end-terminals (not shown) and to convert or compress the video signal for broadcasting or for transmitting to other participating user terminals. The television broadcasting systems 670 are configured to receive encoded video signals from one or more different broadcasting centers (or channels), to decode each video signal and to display the decoded video signals on a display device (not shown).

As shown in FIG. 6, the devices and systems 610-680 are coupled to communication networks/channels 690. Communication networks/channels 690 supports an exchange of video signal encoded in accordance with one or more video encoding standards such as, but not limited to, H. 263, H. 264/AEC, and HEVC (H. 266), for example. Accordingly, the devices and systems 610-680 are required to process (encode and/or decode) video signals complying with such standards. The systems and devices 610-680 are implemented with one or more functional units that are configured to perform signal processing, transmitting and/or receiving of video signals from communication networks/channels 690. When each device in the described environment performs video encoding or decoding, one or more embodiments described in this disclosure are used.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. The terms "inactivation" or "inactivated" or turn "OFF" or turned "OFF" is used to describe a deactivation of a device, a component or a signal. The terms "activation" or "activated" or turned "ON" describes activation of a device, a component or a signal.

Modifications are possible in the described embodiments, and other embodiments are possible, within the scope of the claims.

What is claimed is:

1. A video encoder configured to receive a frame and configured to divide the frame into a plurality of tiles, the video encoder comprising:
   a plurality of video processing engines communicatively coupled with each other, each video processing engine configured to receive a tile of the plurality of tiles, wherein a height of each tile is equal to a height of the frame, and each tile comprises a plurality of rows, each video processing engine including a loop filter and a work memory, the work memory configured to store a set of parameters and partially filtered pixels from the loop filter corresponding to a set of LCUs (largest coding units);
   a shared memory coupled to the work memory of each video processing engine;
   a first and a second video processing engine of the plurality of video processing engines, the second video processing engine being initiated after the first video processing engines processes M rows of the plurality of rows of the tile, where M is an integer; and
   wherein
      the first video processing engine, on processing M rows of the first tile, generates a set of parameters and partially filtered pixels corresponding to a set of LCUs in the M rows of the first tile,
      the set of parameters and the partially filtered pixels are stored in a work memory associated with the first video processing engine,
      the set of parameters and the partially filtered pixels are provided from the work memory to the shared memory, and
      the set of parameters and the partially filtered pixels are provided from the shared memory to the second video processing engine for processing the second tile.

2. The video encoder of claim 1, wherein a width of each tile is equal to a width of the frame divided by a number of video processing engines of the plurality of video processing engines.

3. The video encoder of claim 1, wherein in a steady state of the video encoder, the first video processing engine is configured to process a first tile and the second video processing engine processes a second tile in parallel, the first tile and the second tile are adjacent tiles of the plurality of tiles.

4. The video encoder of claim 3, wherein the first video processing engine is configured to process M rows of the first tile before the second video processing engine is initiated to process the second tile.

5. A method of video encoding comprising:
   receiving a plurality of frames;
   dividing each frame of the plurality of frames into a plurality of tiles such that a frame comprises a plurality of tiles and a height of each tile is equal to a height of the frame, and wherein each tile comprises a plurality of rows; and
   processing M rows of a first tile including loop filtering and generating a set of parameters and partially filtered pixels corresponding to a set of LCUs (largest coding units) in the M rows of the first tile,
   storing the set of parameters and the partially filtered pixels,
   processing M rows of a second tile following said processing M rows of the first tile including loop filtering employing the stored set of parameters and partially filtered pixels corresponding to a set of LCUs (largest coding units) in the M rows of the first tile.

6. A video decoder configured to receive a compressed bit-stream corresponding to a frame, the frame includes a plurality of tiles, the video decoder comprising:
   a plurality of video processing engines communicatively coupled with each other, each video processing engine configured to receive a compressed bit-stream corresponding to a tile of the plurality of tiles, wherein each tile comprises a plurality of rows, and wherein, a height of each tile is equal to a height of the frame and a width of each tile is equal to a width of the frame divided by a number of video processing engines in the video decoder, each video processing engine including a loop filter and a work memory, the work memory configured to store a set of parameters and partially filtered pixels from the loop filter corresponding to a set of LCUs (largest coding units);
   a shared memory coupled to the work memory of each video processing engine;
   a first and a second video processing engine of the plurality of video processing engines, the second video processing engine being initiated after the first video processing engines processes compressed bit-stream corresponding to M rows of the plurality of rows of the tile, where M is an integer; and
   wherein
      the first video processing engine, on processing M rows of the first tile, generates a set of parameters and partially filtered pixels corresponding to a set of LCUs in the M rows of the first tile,
      the set of parameters and the partially filtered pixels are stored in a work memory associated with the first video processing engine,
      the set of parameters and the partially filtered pixels are provided from the work memory to the shared memory, and
      the set of parameters and the partially filtered pixels are provided from the shared memory to the second video processing engine for processing the second tile.

7. A computing device comprising:
   a processing unit;
   a memory module coupled to the processing unit; and
   a video encoder coupled to the processing unit and the memory module, the video encoder configured to receive a frame and configured to divide the frame into a plurality of tiles, the video encoder comprising:
      a plurality of video processing engines communicatively coupled with each other, each video processing engine configured to receive a tile of the plurality of tiles, wherein a height of each tile is equal to a height of the frame, and each tile comprises a plurality of rows;

a first and a second video processing engine of the plurality of video processing engines, the second video processing engine being initiated after the first video processing engines processes M rows of the plurality of rows of the tile, where M is an integer;

processing M rows of the first tile in the first video processing engine generates a set of parameters and partially filtered pixels corresponding to a set of LCUs (largest coding unit) in the M rows of the first tile, wherein each row comprises a plurality of LCUs; and the second video processing engine is initiated on receiving the set of parameters and the partially filtered pixels from the first video processing engine.

\* \* \* \* \*